United States Patent
Djurdjevic et al.

(10) Patent No.: US 9,996,879 B2
(45) Date of Patent: Jun. 12, 2018

(54) SELECTIVE DELAYED AND UNDELAYED DATABASE UPDATING

(71) Applicant: TSX INC., Toronto (CA)

(72) Inventors: Deana Djurdjevic, Toronto (CA); Kevin Sampson, Toronto (CA); Derek Hwong, Toronto (CA)

(73) Assignee: TSX INC., Toronto (CA)

( * ) Notice: Subject to any disclaimer, the term of this patent is extended or adjusted under 35 U.S.C. 154(b) by 0 days. days.

(21) Appl. No.: 15/286,069

(22) Filed: Oct. 5, 2016

(65) Prior Publication Data

US 2017/0024820 A1    Jan. 26, 2017

Related U.S. Application Data

(63) Continuation of application No. PCT/CA2015/000412, filed on Jun. 23, 2015.

(60) Provisional application No. 62/061,455, filed on Oct. 8, 2014.

(51) Int. Cl.
*G06Q 40/00* (2012.01)
*G06Q 40/04* (2012.01)
*G06F 17/30* (2006.01)

(52) U.S. Cl.
CPC ....... *G06Q 40/04* (2013.01); *G06F 17/30377* (2013.01)

(58) Field of Classification Search
USPC ...................................................... 705/36 R
See application file for complete search history.

(56) References Cited

U.S. PATENT DOCUMENTS

| | | | | |
|---|---|---|---|---|
| 3,597,742 | A * | 8/1971 | Philipps | G06F 19/322 235/375 |
| 5,657,428 | A * | 8/1997 | Tsuruta | G06N 5/003 706/45 |
| 6,278,982 | B1 * | 8/2001 | Korhammer | G06Q 40/06 705/36 R |

(Continued)

FOREIGN PATENT DOCUMENTS

| | | |
|---|---|---|
| CA | 2707196 A1 | 1/2011 |
| CA | 2876721 A1 | 6/2015 |

(Continued)

OTHER PUBLICATIONS

International Search Report issued by the Canadian Intellectual Property Office dated Sep. 3, 2015 for corresponding International Patent Application No. PCT/CA2015/000412.

(Continued)

*Primary Examiner* — Kirsten Apple
(74) *Attorney, Agent, or Firm* — Perry + Currier Inc.

(57) ABSTRACT

Received data messages are delayed for further processing based on a bypass condition. Data messages that conform to the bypass condition are not delayed. Data messages that do not conform to the bypass condition are delayed by a delay. Data messages can be representative of orders in an electronic marketplace or trading system. The bypass condition can include indication of a post-only order. The bypass condition can further include indication of a volume that meets or exceeds a minimum volume. The delay can be calculated from a base delay and a variance that modifies the base delay. The variance can be randomly or pseudo-randomly selected and can conform to a maximum variance.

17 Claims, 8 Drawing Sheets

(56) References Cited

U.S. PATENT DOCUMENTS

| | | | |
|---|---|---|---|
| 7,315,840 B1* | 1/2008 | Keith | G06Q 40/00 705/35 |
| 7,613,650 B2* | 11/2009 | Smith | G06Q 40/00 705/37 |
| 8,090,641 B1 | 1/2012 | Monroe | |
| 8,296,221 B1* | 10/2012 | Waelbroeck | G06Q 40/00 705/37 |
| 8,494,951 B2 | 7/2013 | Claus et al. | |
| 2004/0081201 A1* | 4/2004 | Simonnet | H04L 41/08 370/469 |
| 2006/0259397 A1 | 11/2006 | Schluetter | |
| 2006/0294058 A1 | 12/2006 | Zarback et al. | |
| 2010/0083052 A1* | 4/2010 | Huber | G06F 11/0709 714/45 |
| 2010/0088216 A1 | 4/2010 | Czupek et al. | |
| 2010/0332367 A1 | 12/2010 | Foygel et al. | |
| 2013/0297478 A1 | 11/2013 | Mannix | |
| 2014/0341041 A1* | 11/2014 | Velev | H04Q 3/0045 370/236 |
| 2015/0066727 A1 | 3/2015 | Wepsic et al. | |
| 2015/0073967 A1 | 3/2015 | Katsuyama et al. | |
| 2015/0356679 A1* | 12/2015 | Schmitt | G06Q 40/06 705/37 |
| 2017/0024820 A1* | 1/2017 | Djurdjevic | G06F 17/30377 |

FOREIGN PATENT DOCUMENTS

| | | |
|---|---|---|
| WO | 0175691 A2 | 10/2001 |
| WO | 2007/002843 A2 | 1/2007 |

OTHER PUBLICATIONS

Written Opinion of the International Authority issued by the Canadian Intellectual Property Office dated Sep. 3, 2015 for corresponding International Patent Application No. PCT/CA2015/000412.

Marina Daras, "EBS Rolls Out Latency Floor for Currency Pairs", Sell-Side Technologies, http://www.waterstechnology.com/sell-side-technology/analysis/2336755/ebs-rolls-out-latency-floor-for-currency-pairs, Mar. 27, 2014.

Joel Clark, "ParFX gains credibility as first phase of on-boarding nears completion", http://www.euromoney.com/Article/3311196/ParFX-gains-credibility-as-first-phase-of-on-boarding-nears-completion.html, Feb. 24, 2014.

* cited by examiner

| EXAMPLE DATA 150 (INC = 0.1 ms, D = 15.0 ms, MV = 1.0 ms) | | | | |
|---|---|---|---|---|
| VARIANCE 120 INC <= v + pv - INC <= MV | LOWER BOUND 128 D + v - INC | UPPER BOUND 132 Prev. Lower + v | BUFFER SIZE TO FLUSH 152 Upper - lower | FLUSH TIME 154 Current time + v |
| 0.1 | 15.0 | 15.1 | 0.1 | Current time + 15.1 |
| 1.0 | 15.9 | 16.0 | 0.1 | Current time + 1.0 |
| 0.1 | 15.0 | 16.0 | 1.0 | Current time + 0.1 |
| 0.5 | 15.4 | 15.5 | 0.1 | Current time + 0.5 |
| 0.3 | 15.2 | 15.7 | 0.5 | Current time + 0.3 |
| 0.8 | 15.7 | 16.0 | 0.3 | Current time + 0.8 |

FIG. 6

SELECTIVE DELAYED AND UNDELAYED DATABASE UPDATING

CROSS-REFERENCE TO RELATED APPLICATIONS

This application claims priority to U.S. App. Ser. No. 62/061,455, filed Oct. 8, 2014, which is incorporated herein by reference.

FIELD

This disclosure relates to electronic data systems.

BACKGROUND

Fast and efficient data processing and database updating is a common problem. For a particular database, it may be the case that new data arrives faster than needed. Processing of such data immediately upon receipt may result in conflicts with other new data that generally arrives more slowly. Further, processing of incoming data may be contingent, or desired to be contingent, on data that has not yet been received.

Electronic marketplaces and trading systems often require fast and efficient data processing, in particular, when data messages representative of orders are received from different parties. Order matching and execution often needs to be performed very quickly and can therefore be susceptible to undesirable latency and other problems.

SUMMARY

According to one aspect of the present invention, a method for updating a database includes receiving a plurality of new data messages in a time-ordered sequence, the new data messages containing data destined for a working database. The new data messages include orders for an electronic marketplace or trading system. The method further includes identifying at least one particular data message of the plurality of new data messages as conforming to a bypass condition that identifies an order as relating to a post-only order, delaying execution of at least one operation on the working database related to ones of the plurality of new data messages other than the identified particular data message, and executing at least one operation on the working database for the identified particular data message without delay.

The bypass condition can further include the post-only order meeting or exceeding a minimum volume.

The method can further include calculating a delay by which to delay execution of the ones of the plurality of new data messages other than the identified particular data message, calculating the delay comprising adding a variance to a base delay.

The method can further include selecting the variance based on a previous variance, and limiting the variance to not exceed a maximum variance.

The method can further include randomly or pseudo-randomly selecting the variance.

According to another aspect of the present invention, a method for processing orders in an electronic marketplace or trading system includes receiving a plurality of new data messages representative of orders in the electronic marketplace or trading system, the new data messages containing data defining the orders. The method further includes identifying at least one particular data message of the plurality of new data messages as conforming to a bypass condition, the bypass condition comprising an indication of a post-only order that increases liquidity in the electronic marketplace or trading system. The method further includes calculating a delay from a base delay and a selected variance, delaying at least one other new data message of the plurality of new data messages by the delay, and processing a post-only order represented by the particular data message without the delay.

The method can further include selecting the variance based on a previous variance, and limiting the variance to not exceed a maximum variance.

The method can further include randomly or pseudo-randomly selecting the variance.

According to another aspect of the present invention, an electronic database updating system includes a processing engine configured to execute operations on a working database, a communications interface configured to receive new data messages containing data destined for the working database, a delay buffer configured to delay passing of new data messages from the communications interface to the processing engine, and a comparator configured to evaluate the new data messages with respect to a bypass condition. The new data messages include orders for an electronic marketplace or trading system and the bypass condition identifies an order as relating to a post-only order. The comparator is configured to pass data messages that do not satisfy the bypass condition to the delay buffer. The comparator is configured to pass data messages that satisfy the bypass condition to the processing engine.

The bypass condition can further include the post-only order meeting or exceeding a minimum volume.

A delay for the delay buffer can be calculated by adding a variance to a base delay.

The variance can be selected based on a previous variance, and the variance can be limited to not exceed a maximum variance.

The variance can be randomly or pseudo-randomly selected.

According to another aspect of the present invention, a system for processing orders for an electronic marketplace or trading system includes a communications interface configured to receive a plurality of new data messages representative of orders in the electronic marketplace or trading system, the new data messages containing data defining the orders. The system further includes memory configured to store at least delayed data messages, and a processor configured to identify at least one particular data message of the plurality of new data messages as conforming to a bypass condition. The bypass condition includes an indication of a post-only order that increases liquidity in the electronic marketplace or trading system. The processor is further configured to calculate a delay from a base delay and a selected variance, delay at least one other new data message of the plurality of new data messages by the delay, and process a post-only order represented by the particular data message without the delay.

The processor can be further configured to select the variance based on a previous variance, and to limit the variance to not exceed a maximum variance.

The processor can be further configured to randomly or pseudo-randomly select the variance.

The system can further include a database update process executable by the processor and configured to evaluate the plurality of new data messages against the bypass condition, and a delay thread executable by the processor and configured to delay the at least one other new data message of the plurality of new data messages by the delay.

BRIEF DESCRIPTION OF THE DRAWINGS

The drawings illustrate, by way of example only, embodiments of the present disclosure.

FIG. 6 is a table of example data related to dequeuing.

DETAILED DESCRIPTION

Figure 1:
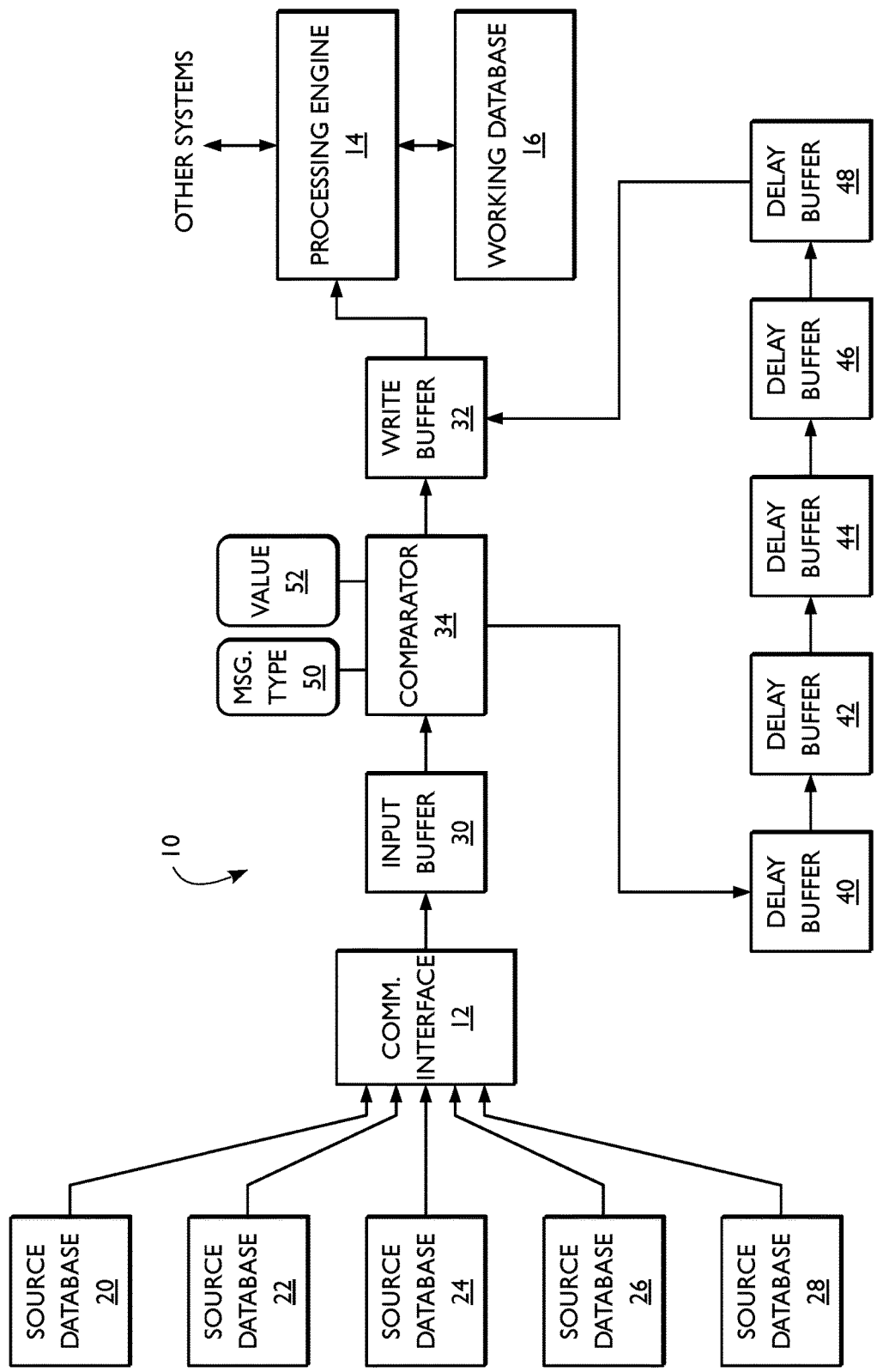
FIG. 1 is a diagram of an electronic database updating system.

FIG. 1 shows an electronic database updating system 10. The system 10 includes a communications interface 12, a processing engine 14, and a working database 16. The communications interface 12 provides newly received data to the working database 16 upon which the processing engine performs various operations. The processing engine 14 may provide processing results to other systems and receive other data and commands from other systems.

The communications interface 12 is a network interface that connects the electronic database updating system 10 to one or more computer networks, such as a local-area network, a wide-area network, or the Internet. The communications interface 12 connects various source databases 20-28 to the system 10. The source databases 20-28 are generally contemplated to be operated by organizations distinct from the organization in control of the system 10 and, as such, may contain different and potentially conflicting data. The source databases 20-28 may operate in different domains from the system 10 and from each other. The source databases 20-28 provide new data to the system 10 through the communications interface 12. The communications interface 12 may be configured to communicate with any number of source databases 20-28.

The communications interface 12 operates according to a common format for receiving data messages from the source databases 20-28, which are configured to comply with the one or more common formats and/or protocols. The communications interface 12 is further configured to maintain the time-ordering in which various messages are received from the source databases 20-28. For instance, the communications interface 12 may timestamp each data message received so that chronological order can be maintained.

The processing engine 14 executes predetermined operations on the data contained in the working database 16. Such operations can include creating, updating, comparing, matching, and deleting of data records within the working database 16. Operations may be triggered upon receiving new data from the source databases 20-28. The operations of the processing engine 14 may be structured to compare and, if possible, match data received from the source databases 20-28 to determine whether one or more existing record of the working database 16 is to be created, updated, or deleted. For example, data messages containing certain values received from one of the source databases 20-28 may trigger the creation of a new record in the working database 16. Received data having other values may trigger the deletion of an existing record in the working database 16. For at least one kind of data message, the processing engine 14 does not compare or match with existing records, and instead immediately creates a new data record.

The working database 16 stores data records that are based on data received from the source databases 20-28. The working database 16 may be a relational database containing various tables of records. The working database 16 may include any number of sub-databases. The working database 16 may be referred to as a data-store.

The electronic database updating system 10 further includes an input buffer 30, a write buffer 32, a comparator 34, and one or more delay buffers 40-48.

The input buffer 30 is a memory space that sequentially receives data messages from the communications interface 12 and sequentially feeds data messages to the comparator 34. The input buffer 30 maintains the time-ordering in which various messages are received from the source databases 20-28.

The write buffer 32 is a memory space that receives data messages from the comparator 34 and from the last delay buffer 48. The processing engine 14 pulls data messages from the write buffer 32 to perform operations on the working database 16.

The comparator 34 includes decision logic configured to determine whether each data message received from the input buffer 30 is to be passed immediately to the write buffer 32 or instead to the first delay buffer 40. Data messages that are passed by the comparator 34 to the write buffer 32 bypass the delay buffers 40-48 and the resulting delay. The comparator 34 references at least one bypass condition when making the determination of whether to bypass the delay buffers 48. In the illustrated implementation, the comparator 34 references a message-type condition 50 and a value condition 52.

The message-type condition 50 and the value condition 52 are selected to cause the processing engine 14 to tend to maintain a certain state of data in the working database 16. The message-type condition 50 identifies newly received data messages that contain data that the processing engine 14 will immediately store in the working database 16 without matching with currently stored records. Comparisons between such newly received data messages and currently stored records may be performed, and if a match is determined to be possible, then the message type condition 50 can be considered to be not met. The message-type condition 50 may identify messages of this type based on a characteristic of the message (e.g., the presence or absence of a particular field) or may identify such messages based on the value of a particular field (e.g., a particular field containing a Boolean true). For example, a data message that represents a post-only order in a electronic marketplace or trading system may contain an attribute or other specified characteristic that identifies the data message as a post-only order permitted to bypass the delay. In such example, the message-type condition 50 is configured to detect the presence, absence, or nature of the attribute or other specified characteristic. In addition, a comparison operation with currently stored records may be performed to confirm that the message-type condition 50 is met for a particular data message. Further, to assist in timely error correction or similar modification, the message-type condition 50 also permits delay bypass for data messages that delete, update, or are otherwise related to database records created based on data messages of this type. Such data messages may also be identified based on the characteristic of the message or the value of a particular field.

The value condition 52 identifies newly received data messages that tend to help maintain the certain state of data in the working database 16. The value condition 52 is optional and may be used to further reduce the number of messages that meet the message-type condition 50.

Message-type conditions 50 alone or in combination with value conditions 52 can be used together to implement complex criteria. For example, a message-type condition 50 that identifies the type of data message that unconditionally creates a new record in the working database can be paired with a value condition 52 that defines a minimum value to be stored in such record. In the same example, a message-type condition 50 that identifies a data message that deletes the same type of data record from the working database can be unassociated with a value condition 52.

Further, it should be noted that the bypass condition is based on the content and/or form of the data messages and is not based on the identity of the source database 20-28 nor the rate or frequency of data messages. Hence, data originating from the source databases 20-28 is treated in the same manner. The system 10 does not discriminate as to data source or rate or frequency of data messages.

It may be beneficial to maintain the state of data in the working database 16 to be amenable to a greater number of potential matches with newly arriving data. This may allow for immediate comparison and, if possible, matching with newly arriving data received from the source databases 20-28.

Newly received data messages that do not satisfy the one or more bypass conditions enforced by the comparator 34 are sent to the delay buffers 40-48. The delay buffers 40-48 maintain the time-ordering sequence of the data messages and advance the data messages towards the write buffer 32 at a specified rate.

The delay buffers 40-48 are memory space configured to delay advancement of a data message from the input buffer 30 to the write buffer 32 by an amount of time. That is, data messages that are not immediately taken from the input buffer 30 and passed to the write buffer are delayed. The delay can be selected to be from about 1 millisecond (ms) to about 500 ms. More particularly, the delay can be selected to be from about 1 ms to about 25 ms. The delay may be a specific static delay (e.g., about 15 ms, 10 ms, 3 ms, etc.). Any suitable period can be selected for the delay, and the above examples are not intended to be limiting. Alternatively or additionally, the delay buffers 40-48 may be configured to implement a dynamic randomized delay, which may be limited to be within specified bounds and which maintains the time-ordering of the delayed data messages.

Incoming data messages are selectively assigned to one of several data paths, where each data path has a different total delay. The lower-delay path runs directly to the write buffer 32, while the higher-delay path runs through the one or more delay buffers 40-48 before the write buffer 32. The differently delayed paths allow for data message traffic to be routed according to needs of the working database 16 and some or all of the source databases 20-28. For example, delaying data messages that do not meet the bypass condition can give slower source databases more time to react to changes within the working database 16, while affording such slower source databases time to react to other information.

Figure 2:
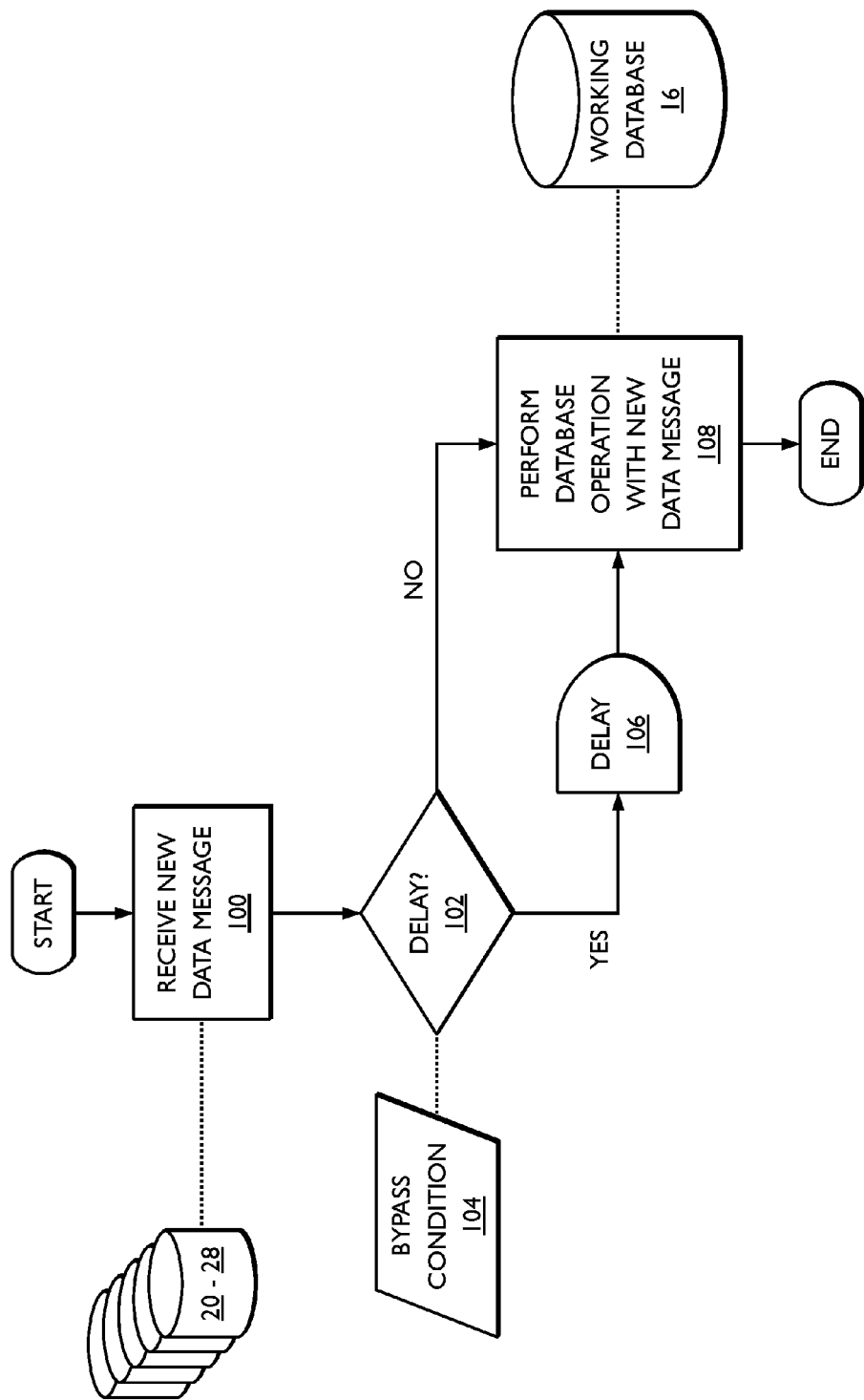
FIG. 2 is a flowchart showing a method of updating a database.

FIG. 2 shows a method of updating a database. For sake of explanation, the method is described with reference to the system 10, but this is not to be taken as limiting. The method operates on one newly received data message and can be performed in parallel or sequentially for various newly received data messages.

At step 100, a new data message is received from, for example, one of the source databases 20-28.

Next, at step 102, the new data message is evaluated for delay with regard to a bypass condition 104, such as the message-type condition 50 optionally in conjunction with the value condition 52. The bypass condition 104 is configured to only be met for new messages that specifically specify that a new database record is to be created at the working database 16 and for new messages that modify or delete existing database records that previously originated from new messages that specifically specify that a new database record is to be created.

When the bypass condition 104 is not met, the data message is delayed at step 106 by a delay. The delay may be static (i.e., affecting all new data messages substantially identically) or dynamic (e.g., randomized) while maintaining time-ordering (sequence) of delayed data messages.

After the delay has elapsed, one or more database operations are performed with the data message on the working database 16. For instance, such operations may result in a new database record being created at the working database 16, an existing database record being updated/modified, an existing database record being deleted, or similar.

When the bypass condition 104 is met, the data message proceeds directly to step 108 without added delay.

Figure 3:
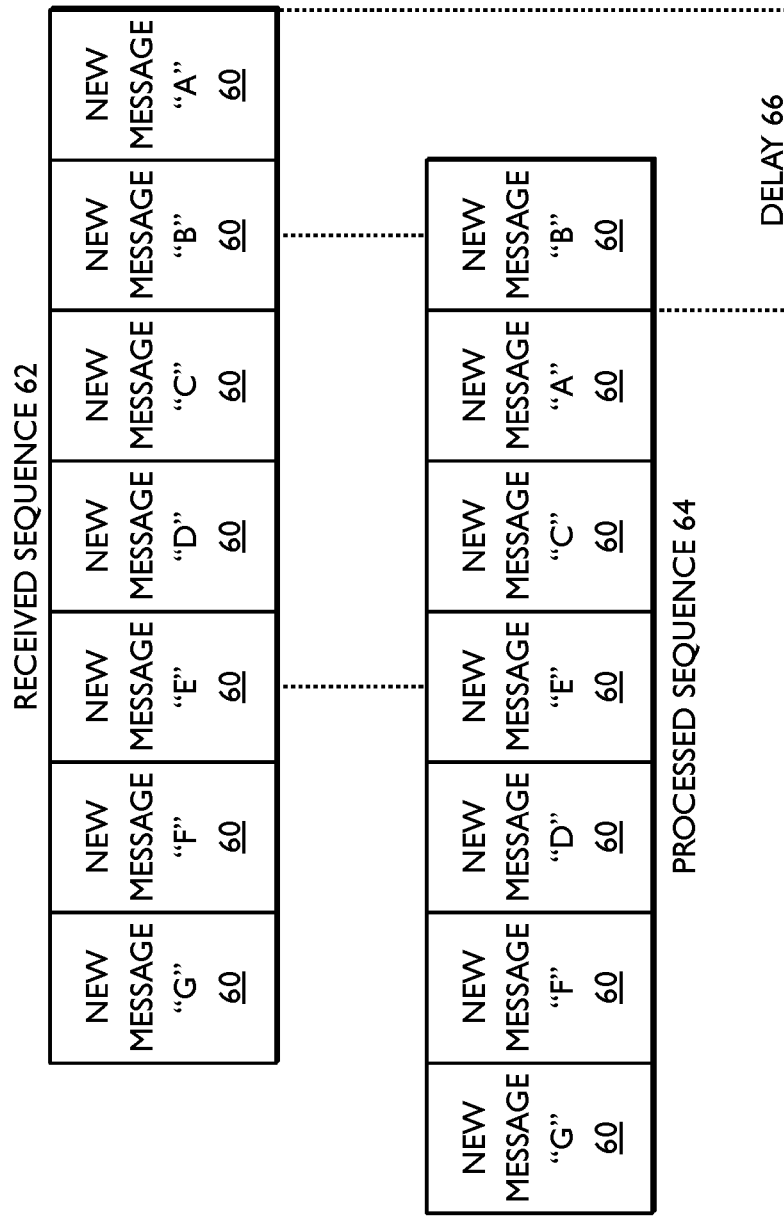
FIG. 3 is a diagram showing delayed and undelayed data messages.

FIG. 3 shows an example of data messages 60 as received and processed. Data messages 60 are received at the system 10 from source databases 20-28. The data messages 60 are received in a temporal sequence 62, with message "A" being received before message "B", and so on to the final received message "G".

In this example, data messages "B" and "E" satisfy the bypass condition, while the remaining data messages 60 do not. Hence, the data messages 60 are processed by the processing engine 14 in a different sequence 64. Data messages "B" and "E" are processed without delay. However, data messages "A", "C", "D", "F", and "G" undergo a delay, illustrated as delay 66 for data message "A". Undelayed data messages "B" and "E" maintain their relative positions from the received sequence 62 to the processed sequence 64. Delayed data messages "A", "C", "D", "F", and "G" also maintained their relative positions from the received sequence 62 to the processed sequence 64. However, undelayed data message "B" is processed before delayed data message "A" and undelayed data message "E" is processed before delayed data message "D".

Figure 4:
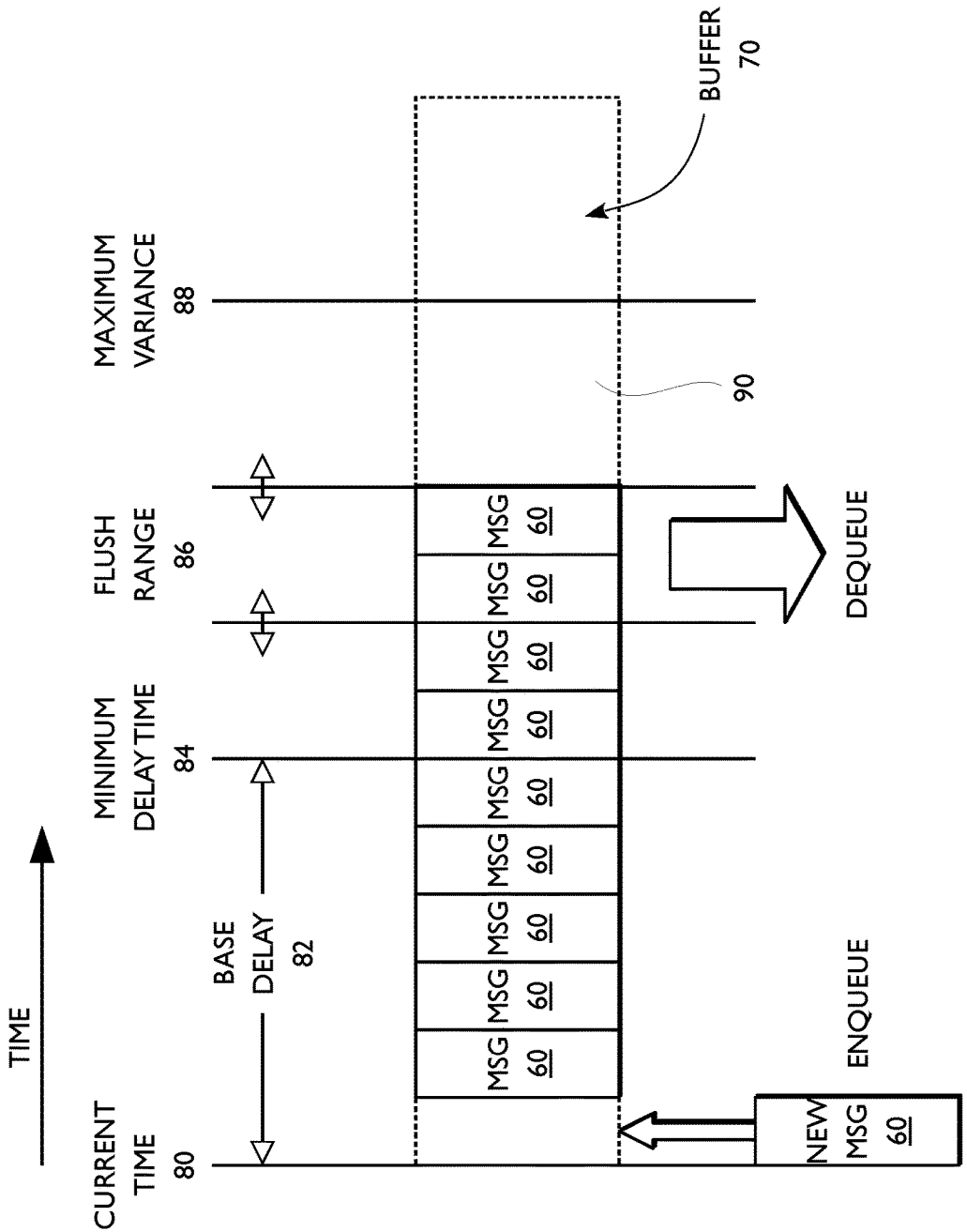
FIG. 4 is a diagram showing queuing and dequeuing of data messages.

FIG. 4 shows another example of a delay buffer 70 for delaying data messages 60. The delay buffer 70 can be used in the electronic database updating system 10, in place of or in addition to the delay buffers 40-48. The delay buffer 70 may be termed a circular buffer.

New messages 60 are chronologically enqueued in the delay buffer 70. Messages 60 older than a minimum delay time 84 and falling within buffer flush range 86 are dequeued for further processing (e.g., by the processing engine 14 of FIG. 1). The minimum delay time 84 is a base delay 82 older than the current time 80. The upper and lower bounds of the buffer flush range 86 are random, pseudo-random, or at least unpredictable, and are limited by a minimum variance and a maximum variance 88. The minimum variance, in this example, coincides with the minimum delay time 84. The upper and lower bounds of the buffer flush range 86 are each limited to occur at discrete increments between the minimum variance and the maximum variance 88.

In a numerical example, the base delay selected to be 15.0 ms, the maximum variance 88 is selected to be 1.0 ms, and the increment for selection of the bounds of the buffer flush range 86 is selected to be 0.1 ms. Hence, each message 60 is delayed by one of the following discrete delays: 15.0, 15.1, 15.2, 15.3, 15.4, 15.5, 15.6, 15.7, 15.8, 15.9, and 16.0 ms. That is, messages 60 are delayed at least 15.0 ms and at most 16.0 ms, in increments of 0.1 ms.

In operation, the bounds of the buffer flush range 86 are calculated after each dequeuing of messages 60, such that no message has a delay that exceeds the maximum variance 88. In the example situation shown in FIG. 4, messages in the buffer region 90 were dequeued immediately before the dequeuing operation illustrated. Rather than dequeuing at the time shown, messages 60 could have been accumulated for a longer time, such as until the maximum variance 88 was reached.

Figure 5:
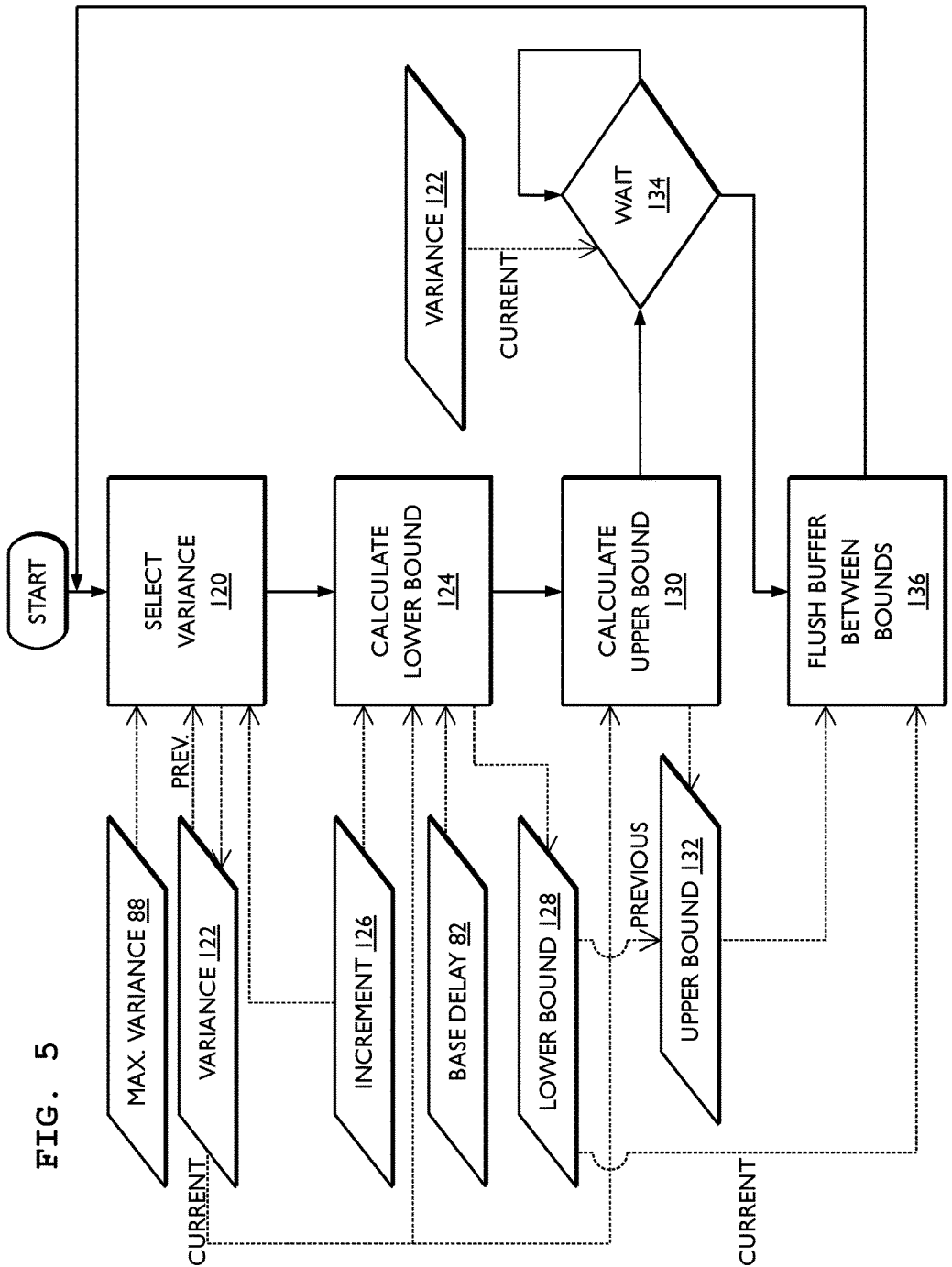
FIG. 5 is a flowchart of a dequeuing process.

FIG. 5 shows a flowchart of a dequeuing operation. The dequeuing operation can be performed continually. The steps and their order described are for illustrative purposes, and more or fewer steps can be used in various different orders. Steps can be combined or further separated.

At step 120, a current variance 122 is selected based on the maximum variance 88 allowed, a previous variance 122, and an increment 126. The current variance 122 is selected according to the following expression:

$$INC<=v+pv-INC<=MV$$

where:
INC is the increment (constant),
v is the current variance being selected,
pv is the previous variance, and
MV is the maximum variance permitted.

Hence, when the previous variance is high, the current variance is selected as low. When the previous variance is low, the current variance can be selected as high. When the previous variance is equal to the increment, then the current variance can be selected to be as high as the maximum variance. In all cases, the current variance is selected as greater than or equal to the increment. The current variance can be selected randomly or pseudo-randomly within the range permitted by the above expression.

The selected current variance 122 is stored and the previous variance can be discarded.

At step 124, the lower bound 128 of the buffer flush range 86 is calculated. Determination of the lower bound 128 can take into account the increment 126, the base delay 82, and the current variance 122 selected in step 120. The lower bound 128 can be calculated based on the following equation:

$$\text{lower bound}=D+v-INC$$

where:
D is the base delay (constant),
v is the current variance, and
INC is the increment (constant).

At step 130, the upper bound 132 of the buffer flush range 86 is calculated. Determination of the upper bound 132 can take into account the lower bound 128 and the current variance 122. The upper bound 132 can be calculated based on the following equation:

$$\text{upper bound}=\text{previous lower bound}+v$$

where v is the current variance.

At step 134, in order to effect the delay, the process waits until the appropriate flush time to dequeue messages 60 in the buffer flush range 86. During operation, the flush time is the current time plus the current variance 122. That is, the amount of time waited between buffer flushes is equal to the current variance 122.

At step 136, messages 60 in the buffer flush range 86 of the buffer 70, that is, messages between the bounds 128 and 132, are dequeued for further processing. The process repeats, with a new current variance 122 being selected.

FIG. 6 shows example data 150 for an increment 126 set to 0.1 ms (100 microseconds), a base delay 82 set to 15 ms, and a maximum variance 88 set to 1.0 ms. Example values for selected variance 120, calculated lower bound 128, and calculated upper bound 132 are shown. Also shown is buffer size to flush 152, which is the size of the buffer flush range 86 (FIG. 4) and calculated as the upper bound 132 less the lower bound 128. Further shown is the flush time 154, which is taken from the current time. Initially, when the buffer 70 is empty, the first flush does not occur until after the base delay 82. Thereafter, during steady-state operation, flush time is the current time plus the variance, that is, the delay is the variance. As the variance 120 is selected randomly or pseudo-randomly, within the limits discussed above, and the buffer size to flush 152 is based on selected variance 120, then messages 60 are delayed for a predefined base delay 82 with a randomly or pseudo-randomly determined variance 120 that is capped at a maximum variance 88.

Figure 7:
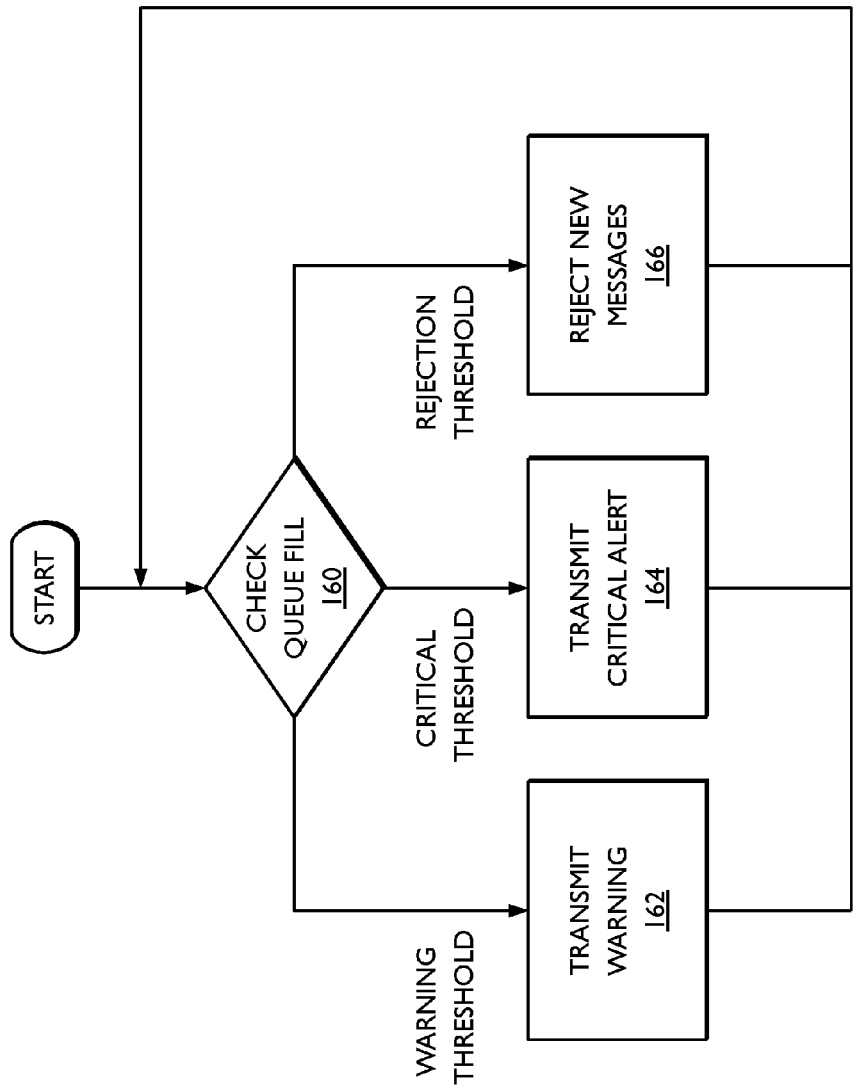
FIG. 7 is a flowchart of a process for managing delay buffer use.

FIG. 7 shows a process for managing usage of a delay buffer, such as the delay buffers 40-48 and 70, discussed above. The process can be performed continually. The steps and their order described are for illustrative purposes, and more or fewer steps can be used in various different orders. Steps can be combined or further separated.

At step 160, the amount of messages in the delay buffer is tallied. The amount can be an absolute numerical quantity or a percentage of a total size of the delay buffer. The amount can be in units of messages, kilobytes, megabytes, or similar. The amount can be tallied upon receipt of a new data message, such as at step 100 in FIG. 2. When the amount exceeds a warning threshold (e.g., delay buffer is 60% full), a warning is transmitted at step 162. The warning can be transmitted to the communications interface 12 (see FIG. 1), the processing engine 14, a user interface, or similar. When the amount exceeds a critical threshold (e.g., delay buffer is 90% full), a critical alert is transmitted at step 164. The critical alert can be transmitted to the communications interface 12, the processing engine 14, a user interface, or similar. When the amount exceeds a critical threshold (e.g., delay buffer is 100% full), the delay buffer rejects new message at step 166. The critical alert can be distinguished from the warning in that a more urgent expression can be provided to the user interface.

Figure 8:
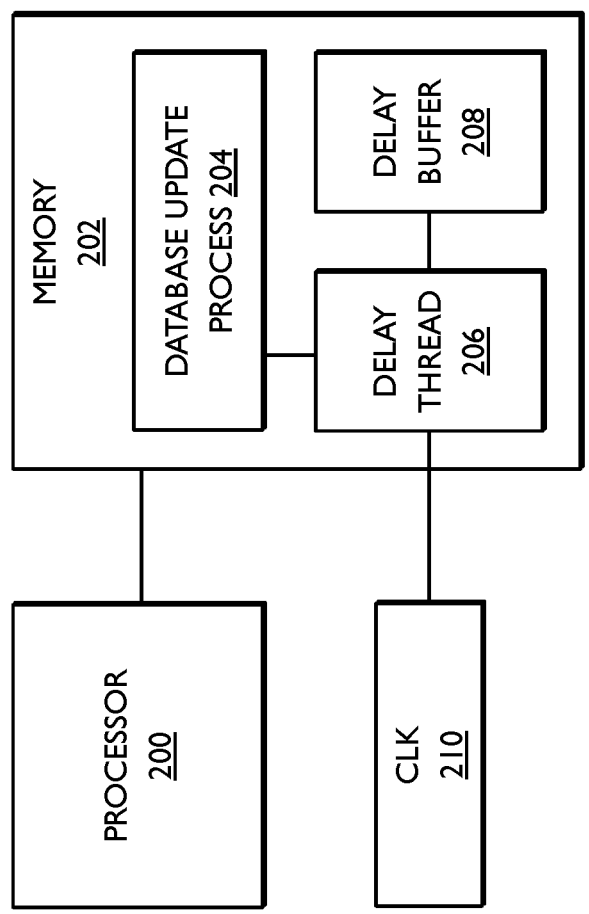
FIG. 8 is a block diagram of another system.

As shown in FIG. 8, the techniques discussed herein can be implemented with a system that includes a processor 200 and cooperating memory 202. The processor 200 can include a single processor, a multi-core processor, a plurality of processors, a field-programmable gate array (FPGA), or similar device configured to execute instructions stored in the memory 202. The memory 202 can include devices such as dynamic random-access memory (DRAM), read-only memory (ROM), and similar. The processor 200 and memory 202 can be used in conjunction with various components 30-52 shown in FIG. 1, to implement such various components 30-52, or to supplement one or more of such various components 30-52.

The method of updating the database (e.g., as shown in FIG. 2) can be implemented as a database update process 204. A delay method (e.g., as shown in FIG. 5) can be implemented as a single delay thread 206 which reads and writes to a delay buffer memory space 208 within the memory 202. The database update process 204 can communicate with the delay thread 206 by making calls to the delay thread 206 to enqueue and dequeue messages. The database update process 204 can be used to evaluate whether a message should be subjected to delay and communicate such to the delay thread 206. The delay thread 206 processes the delay for the indicated messages and communicates dequeued messages to the database update process 204 for further processing. Messages can be passed by reference between the database update process 204 and the delay thread 206, in that message pointers can be communicated. The delay thread 206 can be given access to a system clock 210 to obtain current time directly, or alternatively, via the processor 200. The system clock 210 can be the same system clock that timestamps messages upon receipt.

The delay thread 206 can include or have access to a random or pseudo-random number generator to select the variance as discussed above.

The techniques described above can be implemented in an electronic marketplace or trading system for issuing, trading, holding, transferring, buying, selling, or participating in other types of exchange for one or more financial instrument or interest. Electronic marketplaces and trading systems include one or more electronic networked order books, venues, trading venues, securities trading venues, marketplaces, exchanges, private equity exchanges, public securities exchanges, order books (e.g., dark books, lit books, etc.) within an exchange, alternative trading systems, and/or other markets, alone or in combination. Financial instruments and interests include exchange-traded funds (ETFs), securities, debt, shares, stocks, derivatives, and similar or other type of financial product, instrument, or interest. The techniques discussed herein can be applied to various computerized trading systems, including those operating in various marketplaces.

In such implementations, data messages 60 represent orders, such as newly placed orders, as well as modifications or cancellations of existing orders. The working database 16 is an order-book database that stores existing passive orders in data records. The processing engine 14 is a matching and order-execution engine that operates on newly received orders and on passive orders resting in the order-book database. The processing engine 14 matches active orders with passive ones. Source databases 20-28 are ordering systems operated by market participants, such as brokers, traders, or other entities.

All orders, including new orders, modifications, and cancellations, are delayed by the system 10, except for orders that meet the bypass condition. The bypass condition identifies orders that are new post-only order that meet or exceed a minimum volume (e.g., 1000 shares). Post-only orders are orders that specifically specify that the order is to be rested in the order book. The satisfying of the bypass condition can be confirmed by the processing engine 14 comparing the post-only order with passive orders present in the working database 16 to ensure that a match is not possible. The bypass condition can further identify related orders that modify or cancel such post-only orders. Such a bypass condition can be achieved by setting the message-type condition 50 and the value condition 52 appropriately. Hence, only orders (and corrections thereto) that provide a sufficient amount of added liquidity to the order book are not delayed.

The message-type condition 50 can be set to identify new post-only orders and modifications thereto and cancellations thereof, so that such order bypass the delay. The value condition 52 can be set to only bypass post-only orders that provide a minimum volume. Delaying all orders except post-only orders may advantageously discourage latency-sensitive liquidity-taking trading strategies. This is contemplated to encourage passive liquidity by providing protection against latency sensitive, opportunistic liquidity taking strategies, and therefore increasing the likelihood for all providers of passive liquidity of interacting with the active orders of less or non-latency sensitive strategies. The delay will also allow for more effective risk management of booked orders.

A minimum volume for post-only orders to bypass the delay will help to ensure that passive liquidity providers provide volume against which active non-latency sensitive orders can be executed. Larger displayed volumes can benefit active market participant's orders through larger trade sizes, better fill rates, and a higher percentage of orders being fully filled on one market. This will have further benefits in the form of a reduction in the associated trading costs. The signaling of liquidity bound for other markets can also be reduced, lessening market impact, and supporting better execution quality for the end investor.

In addition, the techniques discussed above can reduce detrimental latency effects on downstream processing carried out by the processing engine (e.g., trading engine), particularly latency effects associated with batch dequeuing of delayed messages. A random or pseudo-random delay, within prescribed limits, can be implemented with tightly controlled dequeuing to reduce or prevent an increase in overall latency for the further processing of all data messages. That is, increased overall efficiency and speed in processing all messages may be realized with the selective delay techniques discussed herein.

While the foregoing provides certain non-limiting example embodiments, it should be understood that combinations, subsets, and variations of the foregoing are contemplated. The monopoly sought is defined by the claims.

What is claimed is:

1. A method for updating a database, the method comprising:
   receiving a plurality of new data messages in a time-ordered sequence, the plurality of new data messages containing data destined for a working database, wherein the new data messages include orders for an electronic marketplace or trading system;
   identifying at least one particular data message of the plurality of new data messages as conforming to a bypass condition, the bypass condition for determining a first type of the new data messages to pass to a processing engine directly for processing, wherein the bypass condition includes one or more of identifying a first type of the new data messages as relating to a post-only order and comparing an order represented by at least one particular data message of the first type of the new data messages with orders represented by currently stored records in the database to determine that a match is not possible;
   in response to not satisfying the bypass condition, automatically passing a second type of the new data messages to a delay buffer;
   automatically generating delayed messages based on the second type of the new data messages and sending the delayed messages to the processing engine; and
   executing without delay data messages in the first type of the new data messages.

2. The method of claim 1, wherein the bypass condition further comprises the post-only order meeting or exceeding a minimum volume.

3. The method of claim 1, further comprising calculating a delay by which the delayed messages are to be delayed, calculating the delay comprising adding a variance to a base delay.

4. The method of claim 3, further comprising selecting the variance based on a previous variance, and limiting the variance to not exceed a maximum variance.

5. The method of claim 4, further comprising randomly or pseudo-randomly selecting the variance.

6. A method for processing orders in an electronic marketplace or trading system, the method comprising:
 receiving a plurality of new data messages representative of orders in the electronic marketplace or trading system, the plurality of new data messages containing data defining the orders;
 identifying at least one particular data message of the plurality of new data messages as conforming to a bypass condition, the bypass condition for determining a first type of the new data messages to pass to a processing engine directly for processing, the bypass condition comprising an indication of an order that increases liquidity in the electronic marketplace or trading system;
 calculating a delay from a base delay and a selected variance;
 in response to not satisfying the bypass condition, automatically generating delayed messages based on at least one other new data message of the plurality of new data messages by the delay; and
 processing without delay a post-only order represented by the particular data message that conforms to the bypass condition.

7. The method of claim 6, further comprising selecting the variance based on a previous variance, and limiting the variance to not exceed a maximum variance.

8. The method of claim 7, further comprising randomly or pseudo-randomly selecting the variance.

9. An electronic database updating system comprising:
 a processing engine configured to execute operations on a working database;
 a communications interface configured to receive new data messages containing data destined for the working database, wherein the new data messages include orders for an electronic marketplace or trading system;
 a comparator configured to evaluate the new data messages with respect to a bypass condition, the bypass condition for determining a first type of the new data messages to pass to the processing engine directly for processing, the bypass condition including one or more of identifying a first type of the new data messages as relating to a post-only order and comparing an order represented by at least one particular data message of the first type of the new data messages with orders represented by currently stored records in the database to determine that a match is not possible; and
 a delay buffer configured to receive a second type of the new data messages from the communications interface, wherein the delay buffer automatically generates delayed messages based on the second type of the new data messages and sends the delayed messages to the processing engine, wherein in response to not satisfying the bypass condition, the comparator is configured to pass the second type of the new data messages to the delay buffer for remotely generating the delayed messages, and wherein in response to satisfying the bypass condition, the comparator is configured to pass the first type of the new data messages to the processing engine directly for processing.

10. The system of claim 9, wherein the bypass condition further comprises the post-only order meeting or exceeding a minimum volume.

11. The system of claim 9, wherein a delay by which the delayed messages are to be delayed is calculated by adding a variance to a base delay.

12. The system of claim 11, wherein the variance is selected based on a previous variance, and the variance is limited to not exceed a maximum variance.

13. The system of claim 12, wherein the variance is randomly or pseudo-randomly selected.

14. A system for processing orders for an electronic marketplace or trading system, the system comprising:
 a communications interface configured to receive a plurality of new data messages representative of orders in the electronic marketplace or trading system, the plurality of new data messages containing data defining the orders;
 memory configured to store at least delayed data messages;
 a processor configured to identify at least one particular data message of the plurality of new data messages as conforming to a bypass condition, the bypass condition for allowing processing of orders at the electronic marketplace or trading system without delay, the bypass condition comprising an indication of an order that increases liquidity in the electronic marketplace or trading system, the processor further configured to calculate a delay from a base delay and a selected variance;
 in response to not satisfying the bypass condition, the processor further configured to generate delayed messages automatically based on at least one other new data message of the plurality of new data messages; and
 in response to satisfying the bypass condition, the processor further configured to process directly a post-only order represented by the particular data message that conforms to the bypass condition.

15. The system of claim 14, wherein the processor is further configured to select the variance based on a previous variance, and to limit the variance to not exceed a maximum variance.

16. The system of claim 15, wherein the processor is further configured to randomly or pseudo-randomly select the variance.

17. The system of claim 14, further comprising:
 a database update process executable by the processor and configured to evaluate the plurality of new data messages against the bypass condition; and
 a delay thread executable by the processor and configured to delay the at least one other new data message of the plurality of new data messages by the delay.

* * * * *